(12) United States Patent
Saboda et al.

(10) Patent No.: US 10,578,355 B2
(45) Date of Patent: *Mar. 3, 2020

(54) ANNULAR DIVIDED WALL COLUMN FOR AN AIR SEPARATION UNIT

(71) Applicants: Kevin J. Saboda, Long Bech, CA (US); Paul W. Belanger, Clarence Center, NY (US); Richard D. Lenz, Tonawanda, NY (US); Kirk F. Larson, Amherst, NY (US); Steven C. Brown, Williamsville, NY (US); John P. Ricotta, Kenmore, NY (US); Guang X. Chen, Williamsville, NY (US); Jeremy D. Faust, Amherst, NY (US)

(72) Inventors: Kevin J. Saboda, Long Bech, CA (US); Paul W. Belanger, Clarence Center, NY (US); Richard D. Lenz, Tonawanda, NY (US); Kirk F. Larson, Amherst, NY (US); Steven C. Brown, Williamsville, NY (US); John P. Ricotta, Kenmore, NY (US); Guang X. Chen, Williamsville, NY (US); Jeremy D. Faust, Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/042,262

(22) Filed: Jul. 23, 2018

(65) Prior Publication Data
US 2019/0063829 A1  Feb. 28, 2019

Related U.S. Application Data

(60) Provisional application No. 62/550,269, filed on Aug. 25, 2017.

(51) Int. Cl.
*B01D 3/14* (2006.01)
*F25J 3/04* (2006.01)
(Continued)

(52) U.S. Cl.
CPC .......... *F25J 3/04939* (2013.01); *B01D 3/008* (2013.01); *B01D 3/141* (2013.01); *B01D 3/326* (2013.01);
(Continued)

(58) Field of Classification Search
CPC ..... B01D 3/141; B01J 19/325; F25J 3/04896; F25J 3/04909; F25J 3/04915;
(Continued)

(56) References Cited

U.S. PATENT DOCUMENTS

| 5,339,648 A | 8/1994 | Lockett et al. |
| 5,632,934 A | 5/1997 | Billingham et al. |

(Continued)

FOREIGN PATENT DOCUMENTS

| CN | 106 642 987 | 5/2017 |
| EP | 1 647 318 A2 | 4/2006 |

(Continued)

OTHER PUBLICATIONS

"Structured Packing", Koch-Glitsch, Bulletin KGSP-2. Rev. Apr. 2015. Available online at: http://www.koch-glitsch.com/Document%20Library/KGSP.pdf (Year: 2015).*

(Continued)

*Primary Examiner* — Jonathan Luke Pilcher
(74) *Attorney, Agent, or Firm* — Robert J. Hampsch

(57) ABSTRACT

An annular divided wall column for the cryogenic rectification of air or constituents of air is provided. The annular divided wall column includes a first annular column wall and a second annular column wall disposed within the first annular column wall to define an annulus column region and (Continued)

an interior core column region. The present annular divided wall column further includes structured packing elements disposed within at least the annulus column region as well as a ring-shaped cantilevered collector; and a ring-shaped distributor disposed in the annulus column region above or below the plurality of structured packing elements. The thermal expansion and contraction of the second annular column wall in a radial direction and in an axial direction is independent of the thermal expansion and contraction of the first annular column wall in the radial and axial directions.

14 Claims, 16 Drawing Sheets

(51) Int. Cl.
  *B01J 19/32* (2006.01)
  *B01D 3/00* (2006.01)
  *B01D 3/32* (2006.01)
  *B01J 19/30* (2006.01)
(52) U.S. Cl.
  CPC .............. *B01D 3/328* (2013.01); *B01J 19/30* (2013.01); *B01J 19/305* (2013.01); *B01J 19/325* (2013.01); *F25J 3/0409* (2013.01); *F25J 3/04084* (2013.01); *F25J 3/04096* (2013.01); *F25J 3/04672* (2013.01); *F25J 3/04872* (2013.01); *F25J 3/04884* (2013.01); *F25J 3/04896* (2013.01); *F25J 3/04903* (2013.01); *F25J 3/04909* (2013.01); *F25J 3/04921* (2013.01); *F25J 3/04927* (2013.01); *B01J 2219/30203* (2013.01); *B01J 2219/30223* (2013.01); *F25J 2205/02* (2013.01); *F25J 2290/44* (2013.01)
(58) Field of Classification Search
  CPC .. F25J 3/04921; F25J 3/04927; F25J 3/04933; F25J 3/04; F25J 3/04018; F25J 3/04024; F25J 3/0403; F25J 3/04036; F25J 3/04042; F25J 3/04048; F25J 3/04054; F25J 30/0406; F25J 3/04066; F25J 3/04072; F25J 3/04406; F25J 3/04424; F25J 3/044; F25J 3/04412; F25J 3/04418; F25J 3/04666; F25J 3/04939
  See application file for complete search history.

(56) References Cited

U.S. PATENT DOCUMENTS

| | | | |
|---|---|---|---|
| 5,845,517 A * | 12/1998 | Attlfellner | ........... F25J 3/04018 62/644 |
| 5,946,942 A | 9/1999 | Wong et al. | |
| 6,023,945 A | 2/2000 | Wong et al. | |
| 6,214,174 B1 | 4/2001 | Matsumoto | |
| 6,240,744 B1 | 6/2001 | Agrawal et al. | |
| 7,604,222 B2 | 10/2009 | Zone et al. | |
| 7,678,237 B2 | 3/2010 | De Graauw et al. | |
| 8,480,860 B2 | 7/2013 | Kovak | |
| 9,004,460 B2 | 4/2015 | Brown et al. | |
| 9,295,925 B2 | 3/2016 | Chen et al. | |
| 9,375,655 B2 | 6/2016 | Billingham et al. | |
| 9,457,291 B2 | 10/2016 | Brown et al. | |
| 9,827,543 B2 | 11/2017 | Pretz | |
| 10,066,871 B2 * | 9/2018 | Prosser | ................ F25J 3/04412 |
| 2004/0134135 A1 | 7/2004 | Zich et al. | |
| 2006/0082006 A1 * | 4/2006 | Zone | ........................ B01D 3/14 261/94 |
| 2006/0230613 A1 | 10/2006 | Whittenberger | |
| 2013/0233016 A1 | 9/2013 | Wilson et al. | |
| 2016/0061541 A1 | 3/2016 | Chen et al. | |
| 2017/0030638 A1 | 2/2017 | Prosser et al. | |
| 2017/0030639 A1 | 2/2017 | Du et al. | |
| 2017/0051971 A1 | 2/2017 | Goloubev | |
| 2017/0108148 A1 | 4/2017 | Lu et al. | |
| 2017/0108296 A1 | 4/2017 | Kwark et al. | |
| 2019/0063827 A1 * | 2/2019 | Larson | ................. F25J 3/04084 |
| 2019/0063828 A1 * | 2/2019 | Larson | ................. F25J 3/04084 |
| 2019/0063829 A1 | 2/2019 | Saboda | |
| 2019/0063830 A1 | 2/2019 | Saboda | |
| 2019/0063831 A1 * | 2/2019 | Saboda | ................... F25J 3/0409 |

FOREIGN PATENT DOCUMENTS

| | | |
|---|---|---|
| FR | 2 776 206 A1 | 9/1999 |
| WO | 2011/064580 A2 | 6/2011 |
| WO | 2012/058009 A2 | 5/2012 |
| WO | WO 2012/056278 | 5/2012 |
| WO | WO 2016/138995 A1 | 9/2016 |
| WO | WO 2017/084729 | 5/2017 |

OTHER PUBLICATIONS

Helmut Jansen et al; "New Horizons for Dividing Wall Columns"; Chemical Engineering, pp. 40-48; www.che.com; Aug. 1, 2014; XP055384430.
Koch-Glitsch, "Packed Tower Internals"; Bulletin KGMTIG-1. Rev. Jun. 2010, available online at http://folk.ntnu.no/skoge/prost/proceedings/distillation10/DA2010%20Sponsor%20Information/Koch%20Glitsch/Packed_Tower/Tower_Internatls/Metal_PTI.pdf (Year: 2010).

* cited by examiner

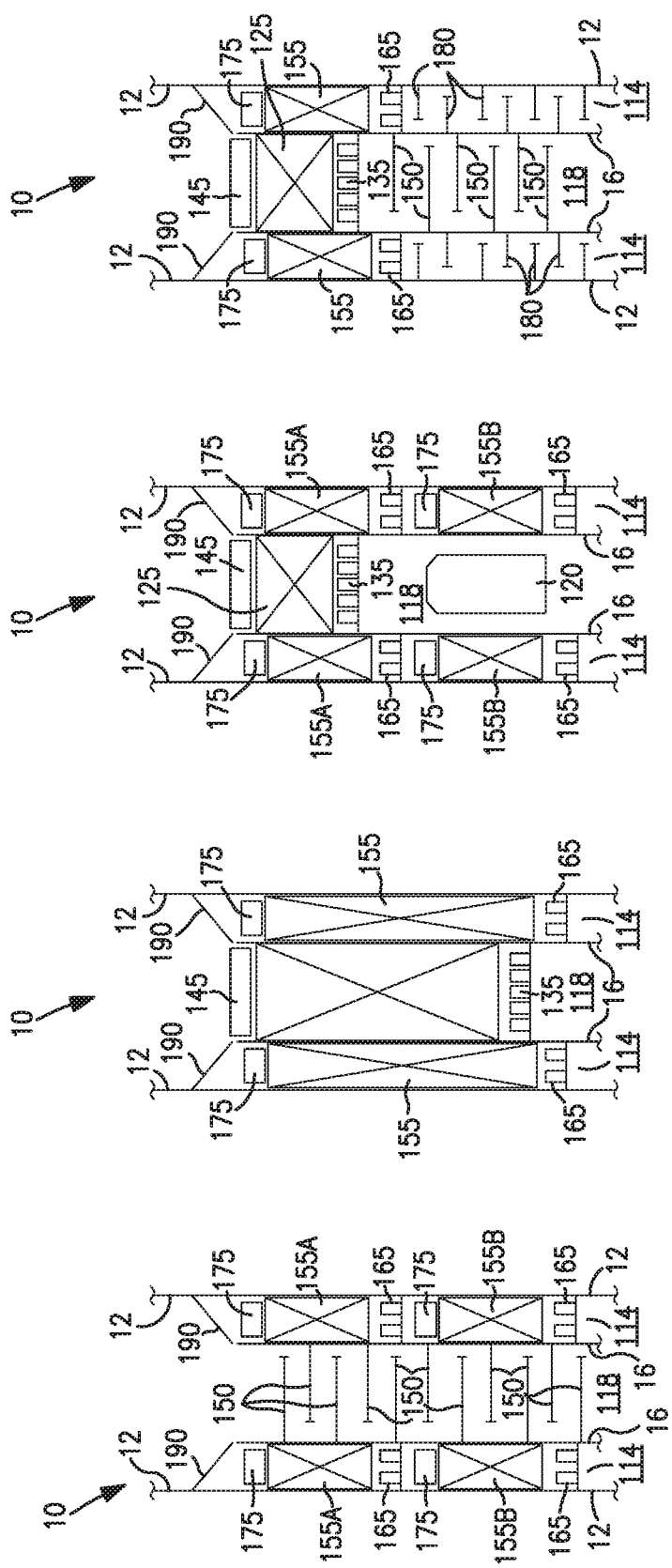

ANNULAR DIVIDED WALL COLUMN FOR AN AIR SEPARATION UNIT

CROSS REFERENCE TO RELATED APPLICATIONS

The present application claims the benefit of and priority to U.S. Provisional Patent Application Ser. No. 62/550,269 filed on Aug. 25, 2017, the disclosure of which is incorporated by reference herein.

FIELD OF THE INVENTION

The present invention relates to annular divided wall columns for the cryogenic rectification of air or constituents of air. More particularly, the present invention relates to an annular divided wall column that includes an annulus column region defined as the space between a first annular column wall and a second annular column wall and an interior core column region defined as the interior space of the second annular column wall with a plurality of packing elements or trays disposed within the interior core column region and the annulus column region.

BACKGROUND

A major capital expense of a rectification plant for the separation of air into components based on their relative volatility is the cost of the column casing and the space required for the column. This is particularly the case where two or more columns are required to conduct the separation. Such multi-column systems are often used in cryogenic rectification, such as in the cryogenic rectification of air, where columns may be stacked vertically or located side by side. It would be highly desirable to have a system which will enable rectification to be carried out with reduced column cost and with reduced space requirements for the columns.

Divided-wall columns have been proposed in the literature as a means to better utilize a given column diameter, and thereby reduce the capital cost associated with construction of a plant to facilitate the separation process. Divided-wall columns essentially contain multiple distillation sections at the same elevation within a single column shell. An early example of the use of a divided-wall column is disclosed in U.S. Pat. Nos. 5,946,942 and 6,023,945 (Wong, et al.) discloses an application of divided-wall principles to air separation. These prior art systems disclose an apparatus wherein the lower pressure column contains an inner annular wall. The region contained between the inner annular wall and the outer shell of the lower pressure column constitutes a section for the production of argon product.

Drawbacks of the prior art divided-wall column systems include various structural and performance compromises made relating to design challenges, including: (i) maldistribution of vapor within the different sections of the divided wall column; (ii) maldistribution of the down-flowing liquids due to the large wall surface areas, particularly where structured packing is employed as the mass-transfer elements; (iii) lower performance of the divided wall columns and column internals due to transient thermal expansion/contraction differences between the inner shell and outer shell; and (iv) inadequacy of a pressure boundary between the interior core column section and annulus column region of the annular divided wall columns.

Accordingly it is an object of this invention to provide an annular divided wall column system for rectification of air which address the above-identified design challenges and overcomes the difficulties and disadvantages of the prior art annular divided wall columns to provide better and more advantageous performance.

SUMMARY OF THE INVENTION

The present invention may be characterized as an annular divided wall column for cryogenic rectification of air or constituents of air, said column comprising: (i) a first annular column wall; (ii) a second annular column wall radially spaced from the first annular column wall and disposed within a first interior space of the first annular column wall to define an annulus column region between the first annular column wall and the second annular column wall and to define an interior core column region as part or all of a second interior space of the second annular column wall; (iii) a conical shaped transition wall connected to the second annular column wall proximate a top end of the second annular column wall and further connected to the first annular column wall and configured to isolate the annulus column region from the interior core column region proximate the top end of the second annular column wall; (iv) a plurality of structured packing elements or trays disposed within the interior core column region; and (v) a plurality of structured packing elements disposed within the annulus column region, wherein thermal expansion and contraction of the second annular column wall in a radial direction and in an axial direction is independent of the thermal expansion and contraction of the [second] first annular column wall in the radial direction and in the axial direction.

BRIEF DESCRIPTION OF THE DRAWINGS

While the specification concludes with claims distinctly pointing out the subject matter that applicants regard as their invention, it is believed that the invention will be better understood when taken in connection with the accompanying drawings in which:

FIG. 1 is a side section, cut-away view of a two-column divided wall arrangement in accordance with an embodiment of the present invention;

FIG. 2 is a side section, cut-away view of a two-column divided wall arrangement in accordance with another embodiment of the present invention;

FIG. 3 is a side section, cut-away view of an annular divided wall column in accordance with one or more embodiments of the present invention;

FIG. 4 is a side section, cut-away view of an annular divided wall column in accordance with still further embodiments of the present invention;

DETAILED DESCRIPTION

Figure 5:
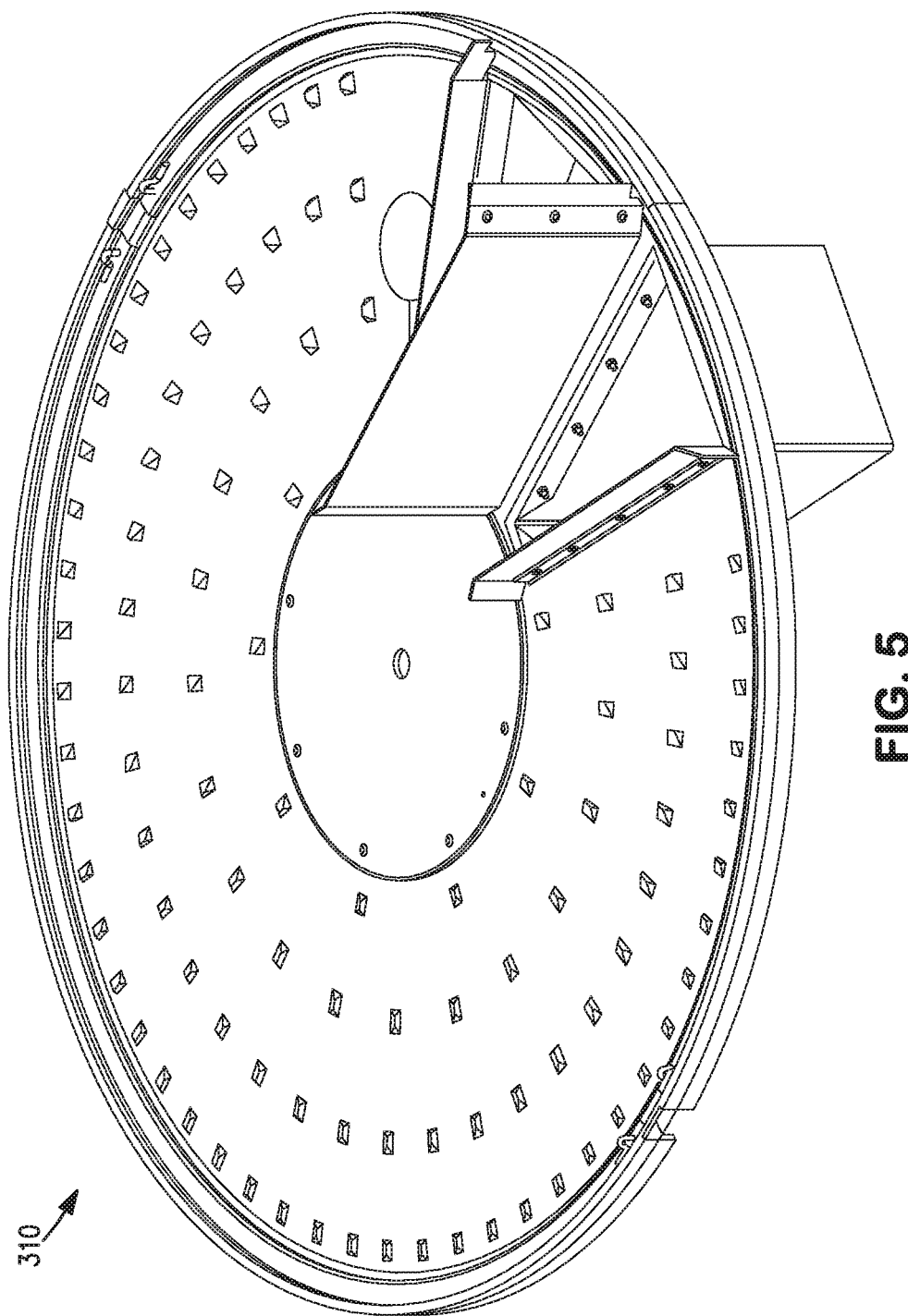
FIG. 5 is an isometric view of a ring tray suitable for use in one or more embodiments of the present annular divided wall column.
Figure 6:
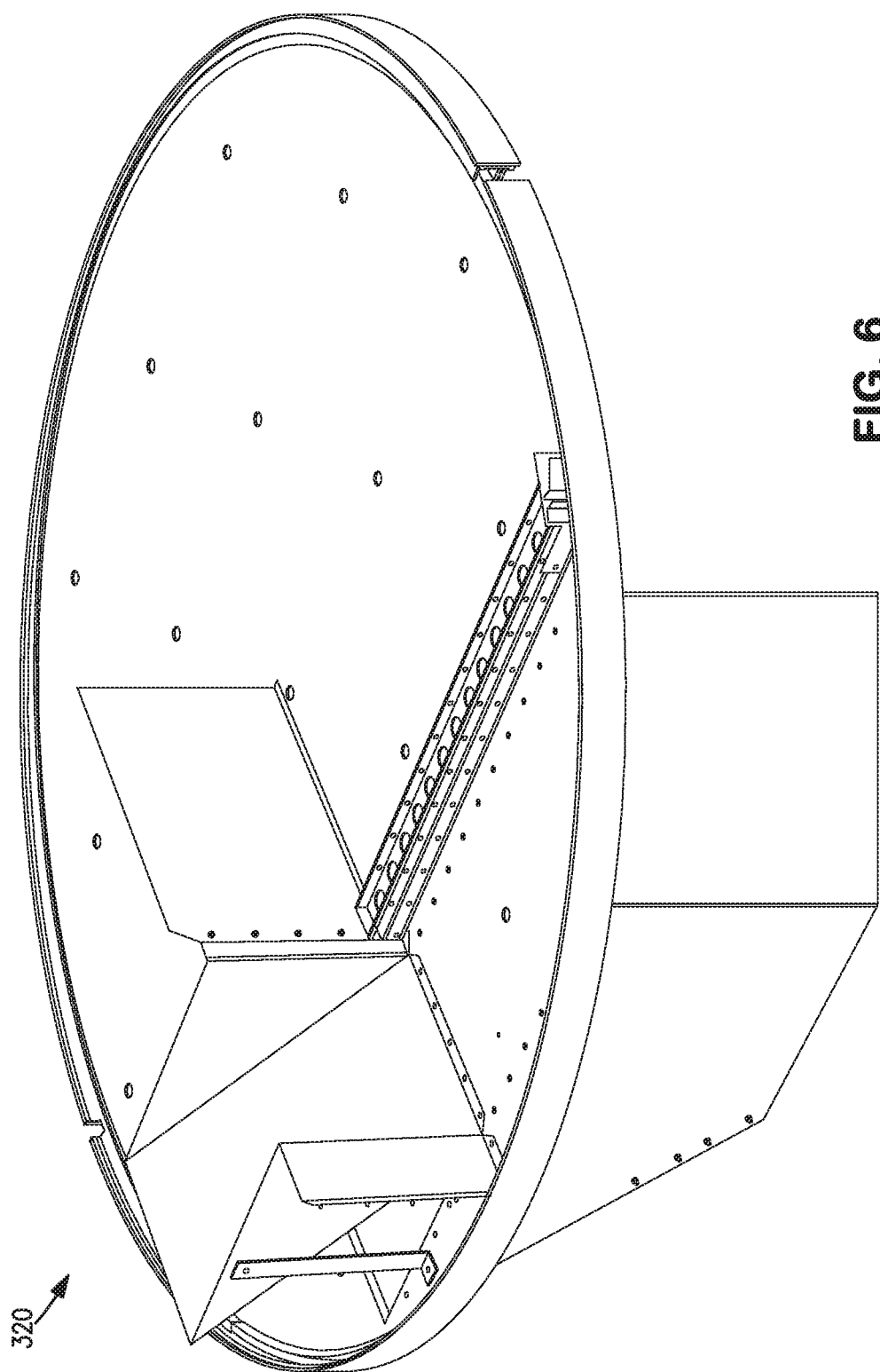
FIG. 6 is an isometric view of a horseshoe tray suitable for use in one or more embodiments of the present annular divided wall column.
Figure 7:
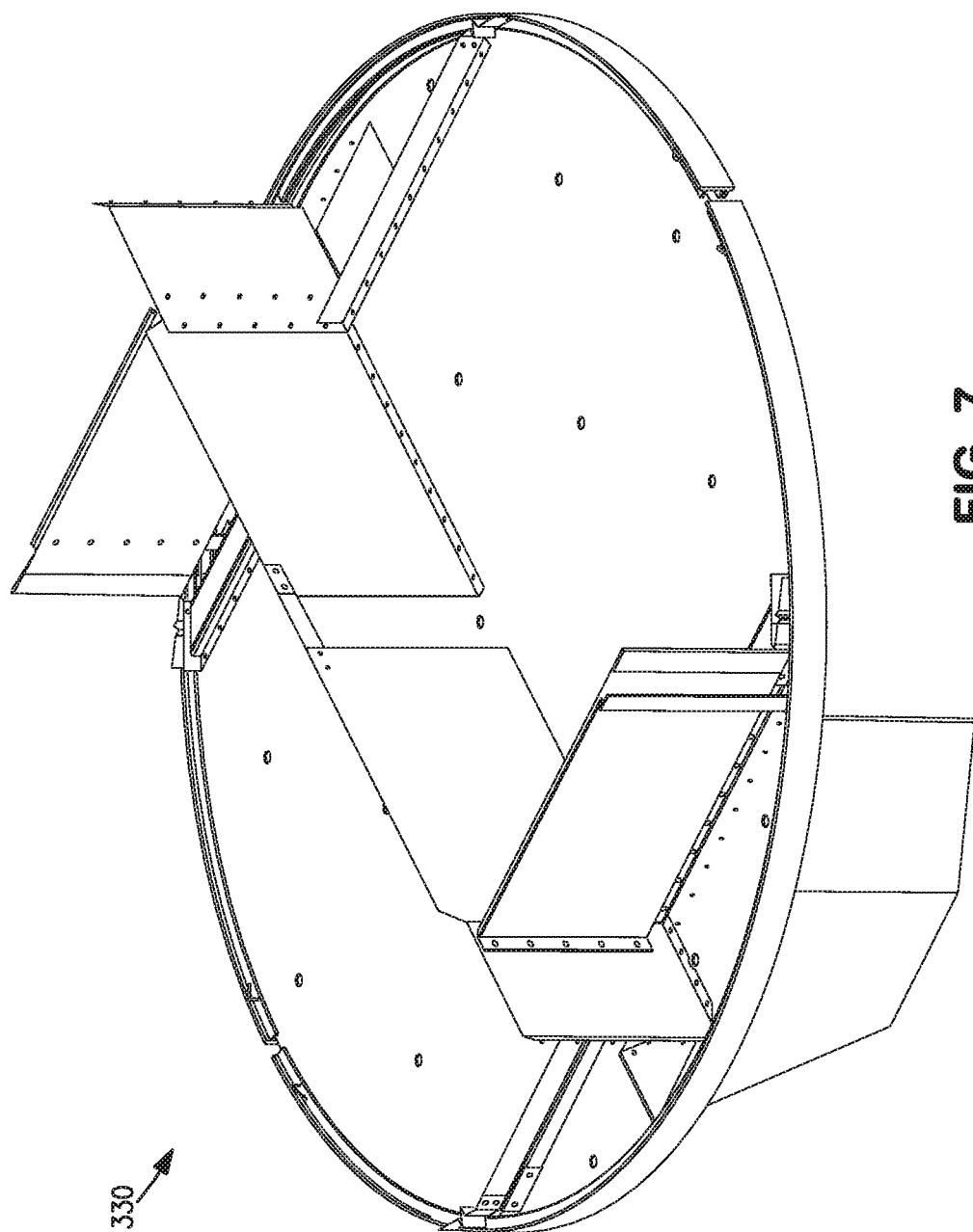
FIG. 7 is an isometric view of a parallel flow tray suitable for use in one or more embodiments of the present annular divided wall column.
Figure 8:
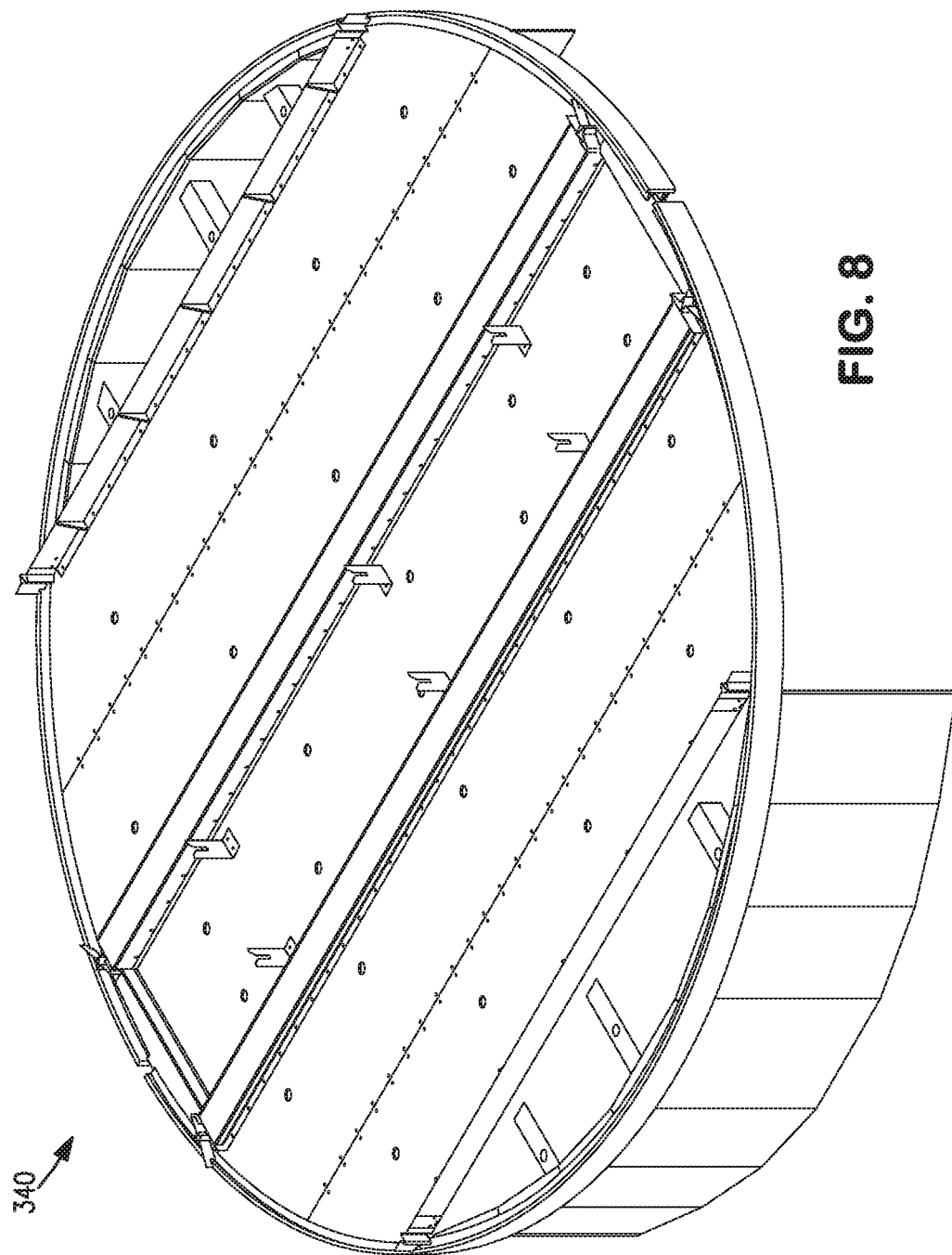
FIG. 8 is an isometric view of a two-pass crossflow tray suitable for use in one or more embodiments of the present annular divided wall column.
Figure 9:
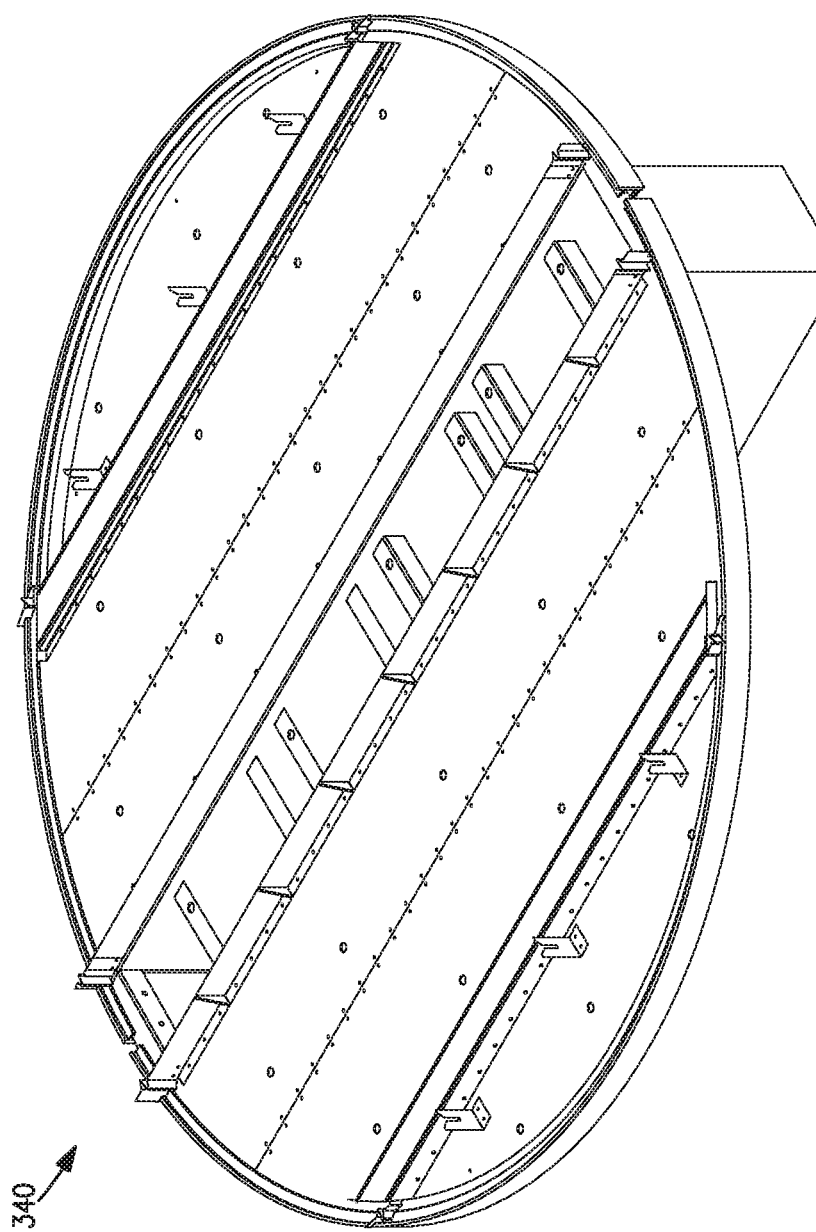
FIG. 9 is an isometric view of another two-pass crossflow tray suitable for use in one or more embodiments of the present annular divided wall column.
Figure 10:
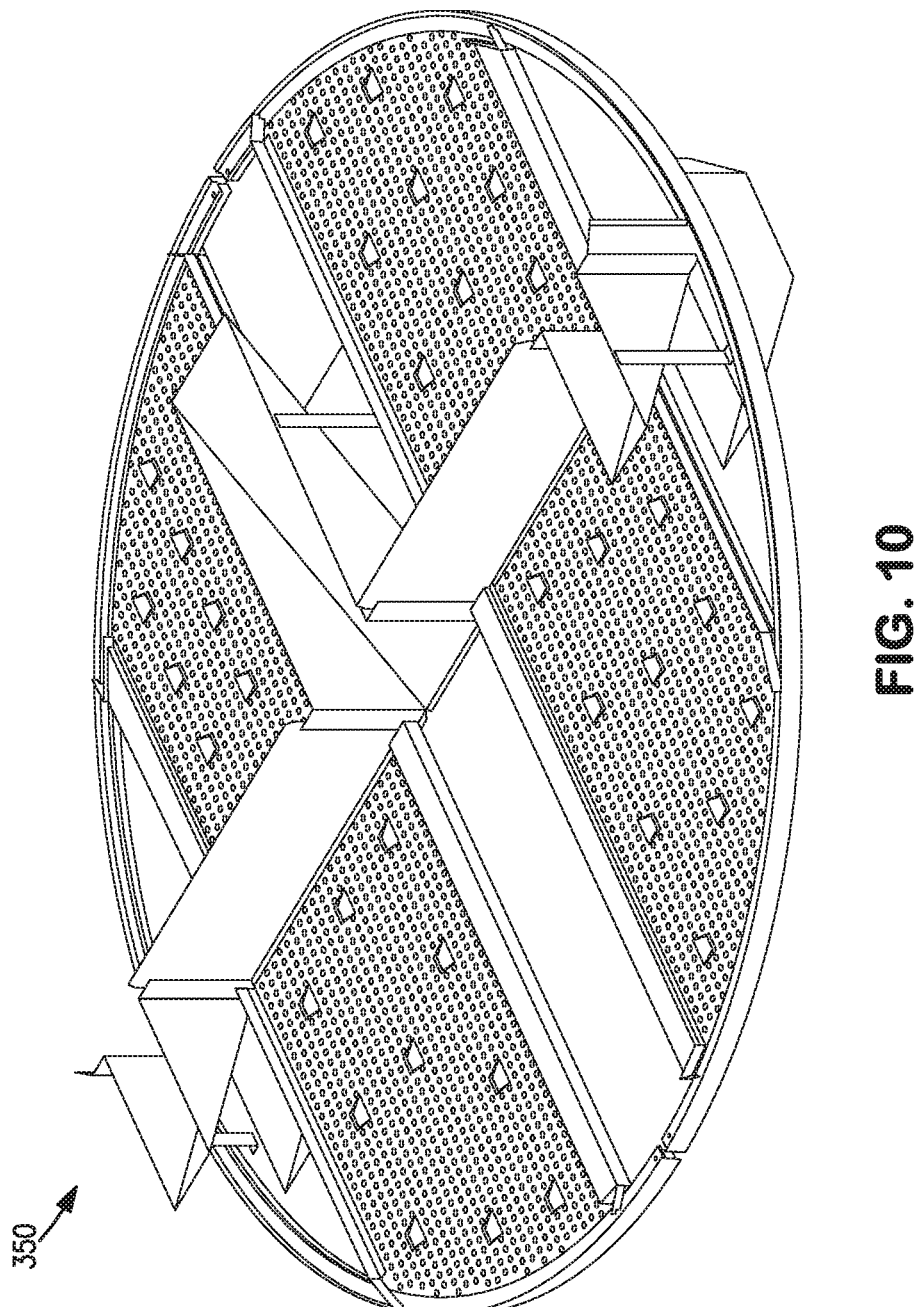
FIG. 10 is an isometric view of a two-pass parallel flow tray suitable for use in one or more embodiments of the present annular divided wall column.
Figure 11:
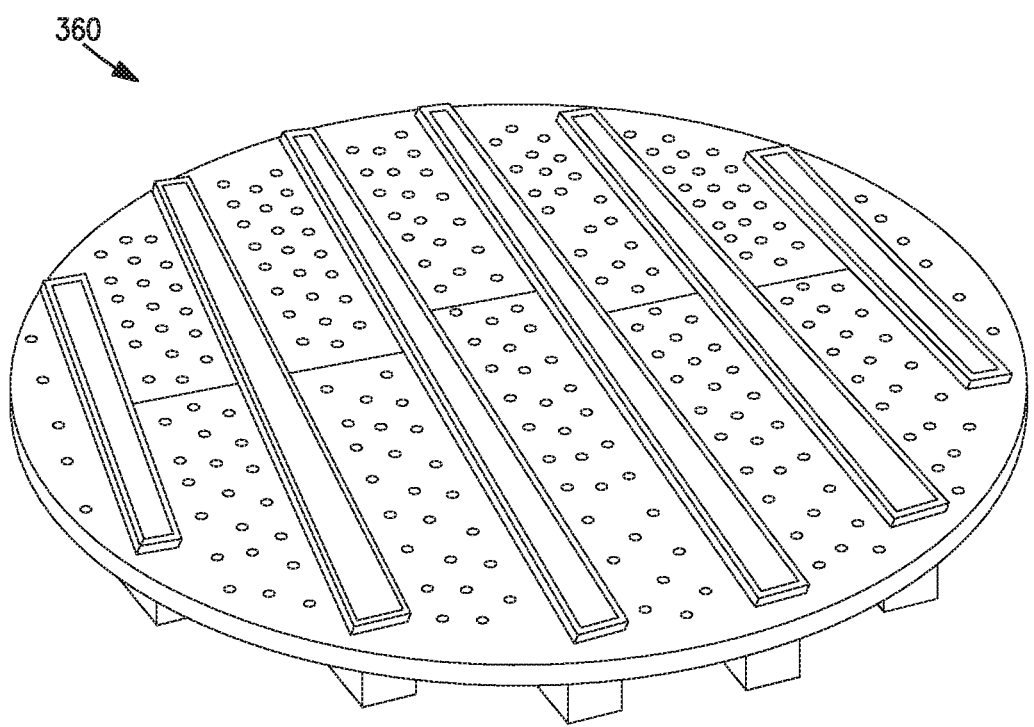
FIG. 11 is an isometric view of a multiple downcomer tray suitable for use in one or more embodiments of the present annular divided wall column.

The following paragraphs include detailed descriptions of various embodiments of the present annular divided wall column for the cryogenic rectification of air, including descriptions of: (i) annular divided wall column configurations; (ii) process and/or service arrangements for the different regions within the annular divided wall column; (iii) arrangements of mass transfer elements within the annular divided wall column; (iv) annular divided wall column structural arrangements; (v) arrangements of collectors, distributors, and support structures within the annulus column region of the annular divided wall column; and (vi) flow distribution arrangements within the annular divided wall column.

Annular Divided Wall Column Configurations

As seen in the drawings, the first annular column wall 12 and the second annular column wall 16 of the annular divided wall column 10 are preferably concentrically disposed relative to one another as shown in FIGS. 1-4 Specifically, in FIG. 2 the annulus column region 114 preferably contains structured packing 155 as well as the associated collectors 165, distributors 175, support structures, caps 190 and piping while the interior core column region 118 also contains structured packing and the associated collectors 135, distributors 145, support structures, caps and piping. The surface area density and/or geometry of the structured packing in the annulus column region 114 may be the same as or different than the surface area density and/or geometry of the structured packing in the interior core column region 118. In FIG. 1 the annulus column region 114 preferably contains a plurality of structured packing 155A, 155B as well as the associated collectors 165, distributors 175, support structures, caps 190, and piping while the interior core column region 118 preferably includes a plurality of trays 150. Similarly, in FIG. 3 there are shown embodiments of the annular divided wall column 10 wherein the annulus column region 114 preferably contains structured packing 155A, 155B as well as the associated collectors 165, distributors 175, support structures, caps 190, and piping while the interior core column region 118 preferably includes a heat exchange device 120, a phase separator device and/or one or more conduits for the movement of liquids and/or vapors within the column. Lastly, in FIG. 4 the annulus column region 114 preferably contains one or more beds of structured packing 155 as well as the associated collectors 165, distributors 175, support structures, and piping together with trays 180 while the interior core column region 118 preferably contains both trays 150 and one or more beds of structured packing 125 as well as the associated collectors 135, distributors 145, support structures, caps, and piping.

In the illustrated embodiments of the two-column divided wall arrangement for the cryogenic rectification of air, the divided wall column is preferably formed with two concentric annular column walls. The first annular column wall is preferably formed by the exterior shell of the air separation column structure such while the second annular column wall extends over only a portion or section of the entire exterior column shell and is preferably disposed within the exterior shell of the air separation column structure. In such two-column divided wall arrangements, the vertical height of the first annular column wall is preferably greater than a vertical height of the second annular column wall.

In the illustrated two-column divided wall arrangements, a cap or header may be employed to partially enclose either the annulus column region or the interior core column region. To partially enclose the annulus column region, a cap or header is placed above the annulus column region that extends from the top of the second annular column wall to an intermediate location of the first annular column wall.

In some embodiments, it may be advantageous to apply a high flux coating or porous coating to an interior surface of the first annular column wall or third annular column wall. Similarly, a high flux coating or porous coating may also be applied to a surface of the second annular column wall, preferably the surface exposed to the colder fluid. As used herein, the terms 'high-flux coating' and 'porous coating' refers to those coatings that by virtue of its built-in porosity enhance boiling by providing so-called nucleation sites. The porous coating provides micro-scale cavities that have the effect of increasing the number of nucleation sites and bubble departure frequency per site. As a result, the boiling rate can be enhanced. Examples of such high flux coatings or porous coatings are described in U.S. Patent Application Publication Nos. 2017/0108148 and 2017/0108296, the disclosures of which are incorporated by reference.

In other embodiments, the interior surface of the first annular column wall, interior surface of the first annular column wall, or one or more surfaces of the second annular column wall may also include surface texturing. The term "surface texturing", as used herein, is to be understood as denoting any roughening, grooving, fluting, or otherwise forming or impressing a geometric pattern on the wall surface. Preferably, if only one surface of the second annular column wall is to be treated, the surface texture should be applied to the colder surface so as to enhance the boiling of liquid that may be trapped on the wall.

Process/Service Arrangements in an Annular Divided Wall Column

In some embodiments, the annulus column region is designed or configured for rectification of an argon-oxygen containing stream to separate the argon-oxygen containing stream into an argon-rich overhead stream and an oxygen-rich stream. In other embodiments, the annulus column region is designed or configured for rectification of a nitrogen-oxygen containing stream to separate the nitrogen-oxygen containing stream into a nitrogen rich overhead stream and an oxygen-rich stream.

Similarly, the interior core column region is designed or configured for rectification of an argon-oxygen containing stream to separate the argon-oxygen containing stream into an argon-rich overhead stream and an oxygen-rich stream. In other embodiments, the interior core column region is designed or configured for rectification of a nitrogen-oxygen containing stream to separate the nitrogen-oxygen containing stream into a nitrogen rich overhead stream and an oxygen-rich stream.

In yet other embodiments, the annulus column region may be designed or configured for rectification of a nitrogen-oxygen containing stream to separate the nitrogen-oxygen containing stream into a first nitrogen rich overhead stream and a first oxygen-rich stream of a first purity and the interior core column region may be designed or configured for rectification of another nitrogen-oxygen containing stream to separate it into a second nitrogen rich overhead stream and a second oxygen-rich stream of a second purity. Alternatively, the annulus column region may be designed or configured for rectification of a nitrogen-oxygen containing stream to separate the nitrogen-oxygen containing stream into a first nitrogen rich overhead stream of a first purity and a first oxygen-rich stream while the interior core column region may be designed or configured for rectification of another nitrogen-oxygen containing stream to separate it into a second nitrogen rich overhead stream of a second purity and a second oxygen-rich stream.

Other contemplated process or service arrangements for the annular divided wall column include disposing a heat exchange device or a phase separator device within the interior core column region. The heat exchange device disposed in the interior core column region is preferably either: (i) an argon condenser configured to condense an argon-rich stream for use as a reflux stream, or a liquid argon product stream; (ii) a main condenser-reboiler configured to condense a nitrogen-rich stream for use as a reflux stream or a liquid nitrogen product stream; or (iii) a subcooler configured to subcool a nitrogen-rich liquid stream, an oxygen rich liquid stream, or a liquid air stream for use in the cryogenic air separation plant. In embodiments where a phase separator device is disposed in the interior core column region, the phase separator is preferably configured to separate a two-phase oxygen-containing stream into an oxygen containing liquid stream and an oxygen containing vapor stream.

Mass Transfer Elements in an Annular Divided Wall Column

Turning now to FIGS. 5-11, the plurality of mass transfer contacting elements disposed within the interior core column region can be trays, packing or combinations thereof. Where trays are employed in the interior core region of the annular divided wall column, suitable types of trays include: ring trays 310 of the type generally shown in FIG. 5; horseshoe trays 320 of the type shown in FIG. 6; parallel flow trays 330 of the type shown in FIG. 7; two pass crossflow trays 340 of the type shown in FIG. 8 and FIG. 9; two pass parallel flow trays 350 of the types shown in FIG. 10; or multiple downcomer trays 360 of the type shown in FIG. 11.

The preferred embodiments include structured packing in either the annulus column region and/or the interior core column region of the annular divided wall column, as such arrangements advantageously provide lower pressure drop, higher efficiency, higher capacity; and reduced liquid hold-up compared to trays and random packing. However, structured packing is prone to liquid maldistribution. Structured packing is generally formed from corrugated sheets of perforated embossed metal or plastic, or wire gauze. The resulting structure is a very open honeycomb-like structure with inclined flow channels of the corrugations giving a relatively high surface area but with very low resistance to gas flow. In applications using structured packing, the structured packing is preferably constructed of materials selected from the group consisting of: aluminum sheet metal, stainless steel sheet metal, stainless steel gauze, and plastic. The surfaces of the structured packing may be smooth or may include surface texturing such as grooving, fluting, or patterned impressions on the surfaces of the structured packing sheets. Examples of the preferred types of structured packing are shown and described in U.S. Pat. Nos. 5,632,934 and 9,295,925; the disclosures of which are incorporated by reference herein.

The size or configuration of structure packing is broadly defined by the surface area density of the packing and the inclination angle of the corrugated flow channels in the main mass transfer section of the structured packing. The preferred density of the structured packing is between about 100 $m^2/m^3$ to 1200 $m^2/m^3$ and more preferably are selected from the group of commercially available structured packing having surface area densities of 110 $m^2/m^3$; 220 $m^2/m^3$; 250 $m^2/m^3$; 350 $m^2/m^3$; 430 $m^2/m^3$; 500 $m^2/m^3$; 730 $m^2/m^3$; 950 $m^2/m^3$; and 1200 $m^2/m^3$. The geometry of the structure packing, as characterized by the inclination angle of the corrugated flow channels in the main mass transfer section of the structured packing, preferably includes a nominal inclination angle to the horizontal axis of between about 35° to 70°, which encompasses the preferred X-size packing (i.e. nominal inclination angle of about 60°), Y-size packing (i.e. nominal inclination angle of about 45°); and Z-size packing (i.e. nominal inclination angle of about 40°).

Figure 12:
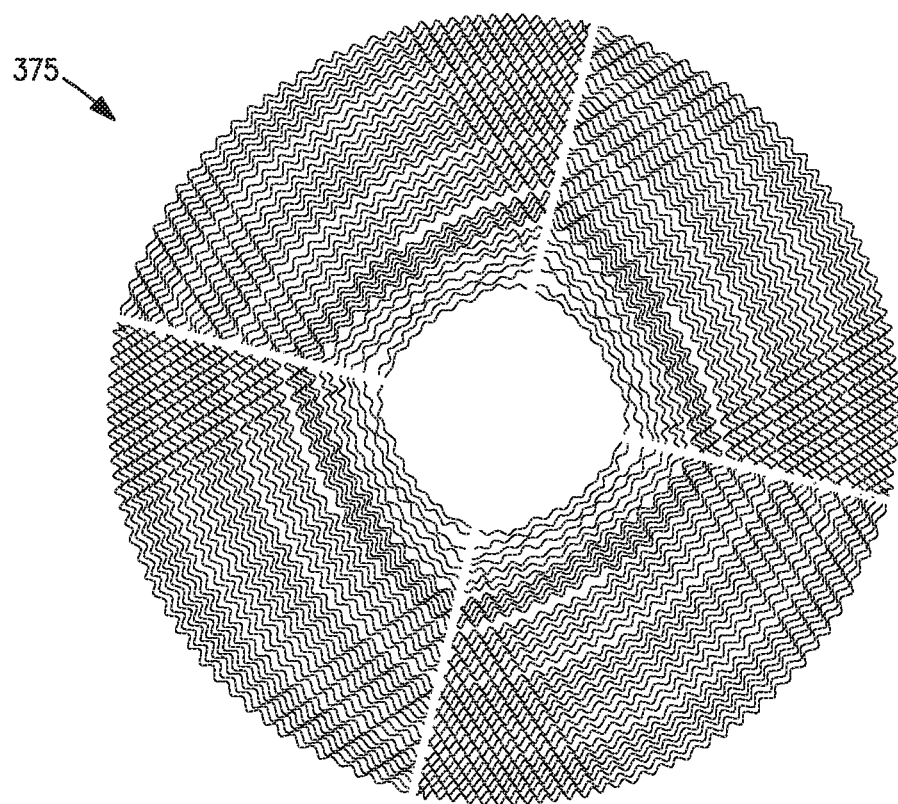
FIG. 12 is a isometric view of a type of arcuate wedge or curved packing suitable for use in one or more embodiments of the present annular divided wall column.

The preferred structured packing configuration for the annulus column region of the annular divided wall column are a plurality of curved or arcuate wedge shaped bricks 375 or curved bricks, shown in FIG. 12. Alternatively, the structured packing for the annulus column region may be configured as a donut shaped disk or as conventional rectangular bricks. Although the curved or arcuate wedge shaped structured packing bricks can also be used in the interior core column region, the preferred structured packing configuration for the interior core column region are round disks (e.g. pancake packing) or conventional rectangular bricks. The preferred height of the disks and/or bricks is between about 10 inches and 12 inches, although half-height bricks of 5 inches to 6 inches may also be used.

In some embodiments, a plurality of structured packing elements of a first type are disposed within the annulus column region and a plurality of structured packing elements of a second type are disposed within the interior core column region, wherein the first type of structured packing elements and the second type of structured packing elements have different surface area densities. For example, the structured packing elements disposed within the annulus column region (argon-oxygen separation) may have a first surface area density whereas the structured packing elements disposed within the interior core column region (oxygen-nitrogen separation) may have different surface area densities.

In other embodiments, the structured packing elements in either the interior core column region or the annulus column region may comprise two or more beds of structured packing. In addition, where multiple beds of structured packing are employed in either region, the adjacent beds may have different surface area densities and/or different geometries. For example, a first bed of structured packing elements having a first surface area density may be disposed within the annulus column region while a second bed structured packing elements having a second surface area density may be disposed within the annulus column region above or below the first bed of structured packing elements. In this example, the first bed of structured packing elements disposed within the annulus column region may have a first surface area density whereas the second bed of structured packing elements disposed within the annulus column region may have a different surface area density. Similarly, the first bed of structured packing elements disposed within the annulus column region may have a first nominal inclination angle to the horizontal axis whereas the second bed of structured packing elements disposed within the annulus column region may have a different nominal inclination angle to the horizontal axis.

Certain preferred embodiments employ a combination of structured packing elements and trays. For example, a plurality of structured packing elements may be disposed within the interior core column region and a plurality of trays is also disposed within the interior core column region above and/or below the structured packing elements. In such embodiments, the structured packing elements disposed within the interior core column region may have a surface area densities of between about 100 $m^2/m^3$ to 1200 $m^2/m^3$ and a nominal inclination angle to the horizontal axis of between about 35° to 70°, while the plurality of trays may be selected from the group consisting of: ring trays; horseshoe trays; parallel flow trays; two pass crossflow trays; two pass parallel flow trays; multiple downcomer trays; or combinations thereof.

Annular Divided Wall Column Structural Arrangements

Figure 13:
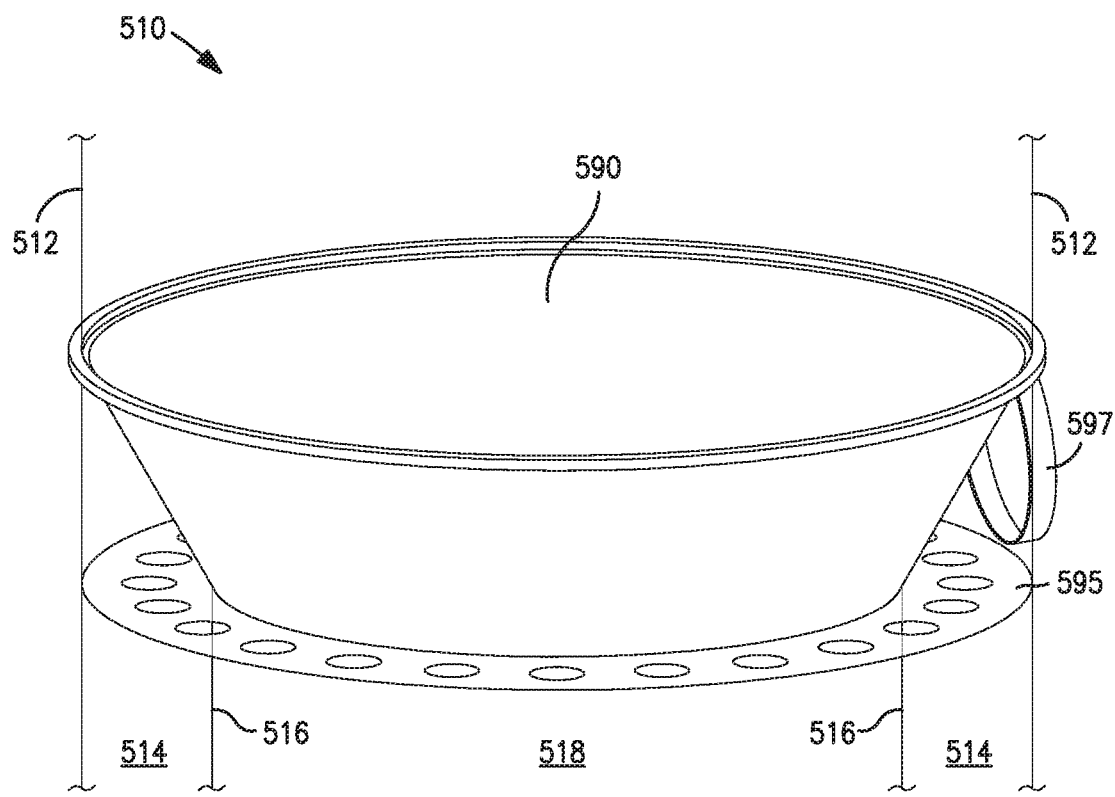
FIG. 13 is a partial isometric view of a section of the present annular divided wall column showing the conical shaped transition wall and perforated plate.
Figure 14:
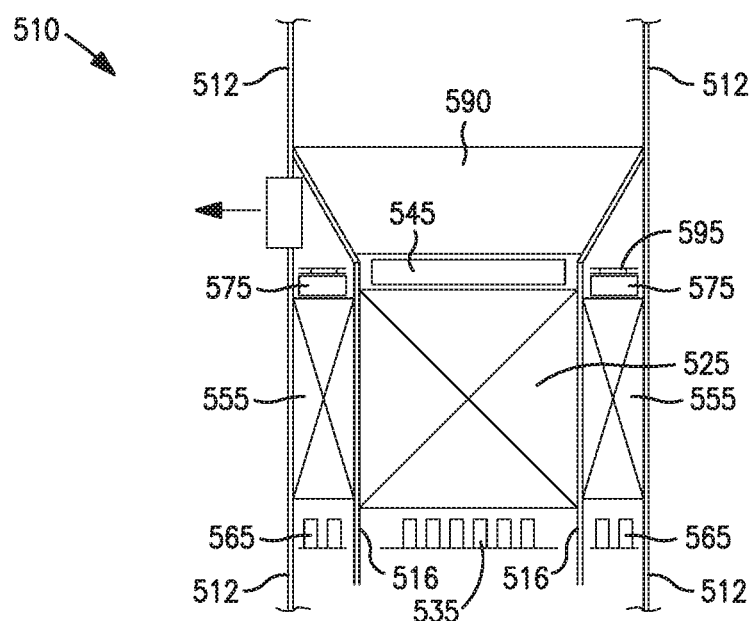
FIG. 14 is a partial cross section view of a section of the present annular divided wall column showing the conical shaped transition wall and perforated plate after installation.
Figure 15:
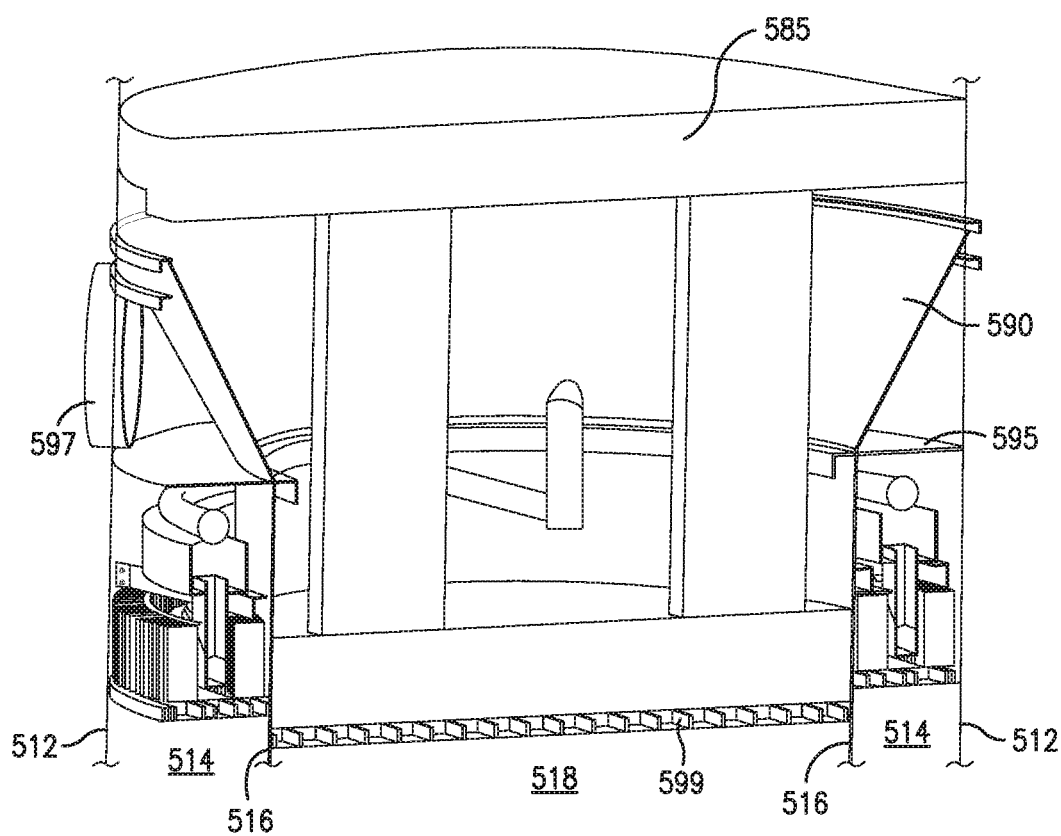
FIG. 15 depicts a partial cross section view of the present annular divided wall column showing the conical shaped transition wall and perforated plate.

As described above, the first annular column wall 512 and the second annular column wall 516 are preferably concentrically disposed relative to one another. More specifically, as shown in FIG. 13, FIG. 14, and FIG. 15 the second annular column wall 516 is hung from or otherwise moveably attached to the first annular column wall 512 of the distillation column 510 by way of a conical shaped transition wall 590 that functions as the cap or header of the annulus column region 514. As seen in figures, the conical shaped transition wall 590 is attached to the second annular column wall 516 and extends from a location proximate the top end of the second annular column wall 516 to an intermediate location of the first annular column wall 512. In this orientation, the conical shaped transition wall 590 is preferably disposed above and covers or caps the annulus column region. In some embodiments, a separate cap or header plate may also be used in conjunction with the conical shaped transition wall. The addition of a temporary plate 599 on the bottom of the column as shown in FIG. 15 allows for independent pressure testing of the column section in the fabrication shop prior to installation to ensure there are no leaks between the two distillation processes in the annulus column region and in the interior core region. FIG. 15 also depicts a shipping support 585 for the column section to be used during transport of the column section from the fabrication site to installation site. While shown in FIGS. 13-15 as fixedly attached to the second annular column wall, the conical shaped transition wall 590 may in some embodiments be removably connected to the second annular column wall while also connected in a fixed or removable manner to the first annular column wall.

In the illustrated embodiments, a ring shaped perforated plate 595 is also disposed circumferentially around the second annular column wall just below the conical shaped transition wall 590. By using the perforated plate 595 and conical shaped transition wall 590, the ascending vapor in the annulus column region 514 is forced to exit the annulus column region via a peripherally disposed outlet 597, which minimizes the internal piping and manifolding typically used in conventional divided wall columns and thereby reducing the overall distillation column height.

Figure 16:
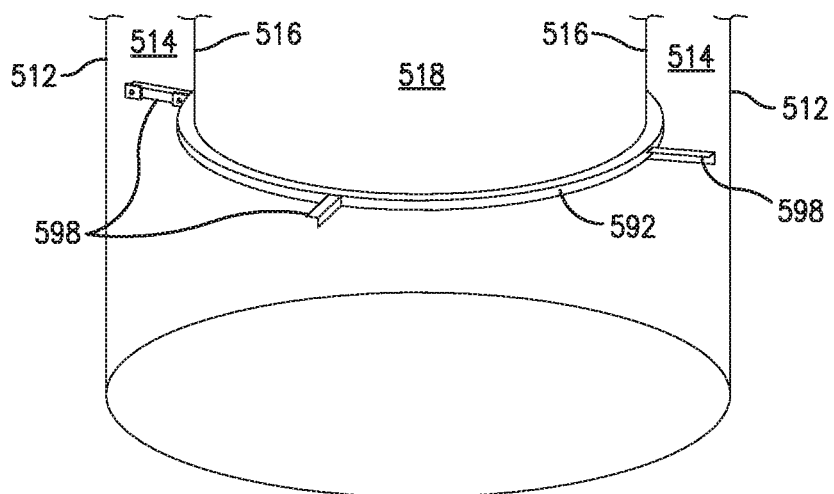
FIG. 16 is a partial isometric view of the present annular divided wall column showing the structural support arrangement between the column walls with the pivoting arms and rolled angle ring.
Figure 17:
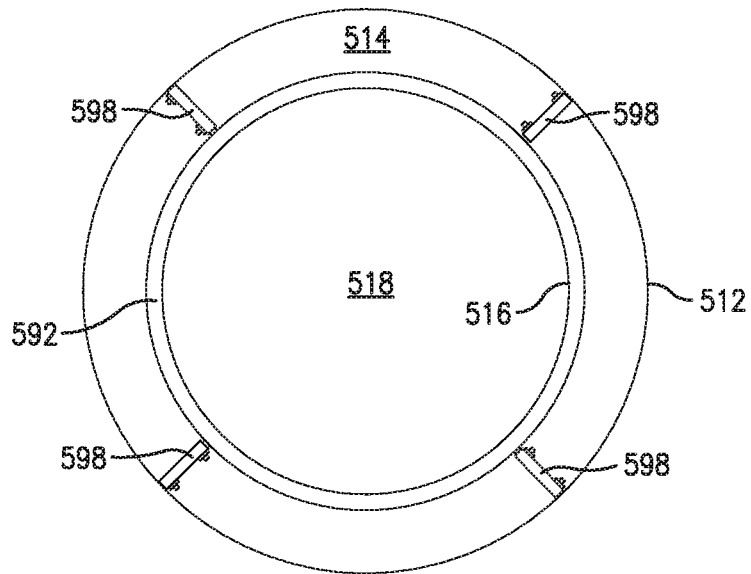
FIG. 17 is a top view of the present annular divided wall column showing the structural support arrangement between column walls with pivoting arms and rolled angle ring.
Figure 18:
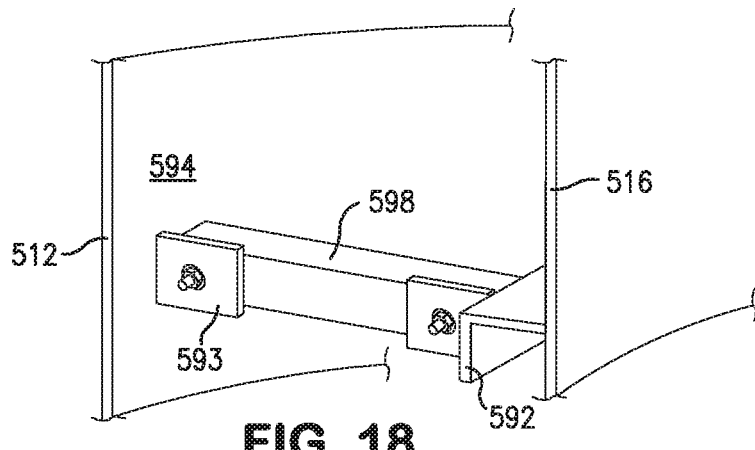
FIG. 18 is a close-up view of the pivoting arms and rolled angle ring connecting the column walls in an embodiment of the present annular divided wall column.

Proximate the lower end of the annulus column region 514, the second annular column wall 516 is connected to and structurally supported by the first annular column wall 512 of the distillation column 510 using a plurality of pivoting arms 598 that are disposed around the periphery of the second annular column wall 516 at a lower location as shown in FIGS. 16-18. The exterior surface of lower section of the second annular column wall 516 includes a rolled angle ring 592 which acts as a stiffening support of the second annular column wall 516 allowing differential pressures between the interior column region 518 and the adjacent annulus column region 514. One end of each pivoting arm 598 is bolted or otherwise attached to the rolled angle ring 592 while the other end of each pivoting arm 598 is bolted or otherwise attached to one or more weld tabs 593 extending from the interior surface 594 of the first annular column wall 512.

Arranging and connecting the first annular column wall 512 and the second annular column wall 516 as described above provides two distinct advantages. First, hanging the second annular column wall 516 from the first annular column wall 512 by way of the conical shaped transition wall 590 and use of the pivoting arms 598 allows for radial and axial thermal expansion and contraction of the first annular column wall 512 to be free relative to the radial and axial thermal expansion and contraction of the second annular column wall 516. In other words, the thermal expansion and contraction of the second annular column wall 516 in a radial direction and in an axial direction is independent of the thermal expansion and contraction of the first annular column wall 512 in the radial direction and in the axial direction. Also, the connecting arrangements described above eliminates the need for the large and cumbersome inner shell support structures that are typically used in conventional annular divided wall columns thereby reducing the overall column height.

Figure 19:
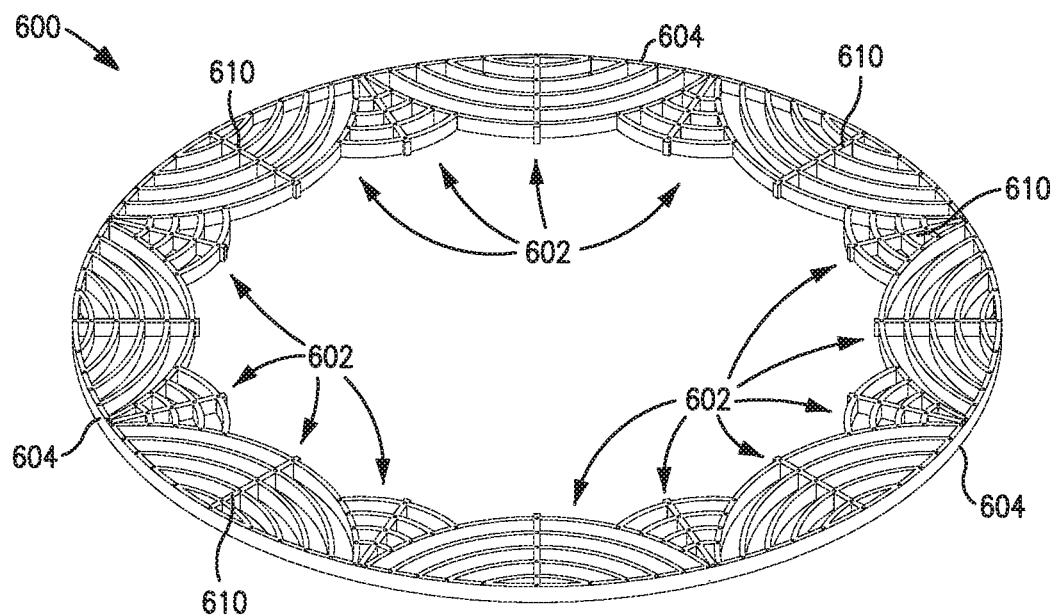
FIG. 19 is a partial isometric view of the ring-shaped support grid suitable for use in embodiments of the present annular divided wall column.
Figure 20:
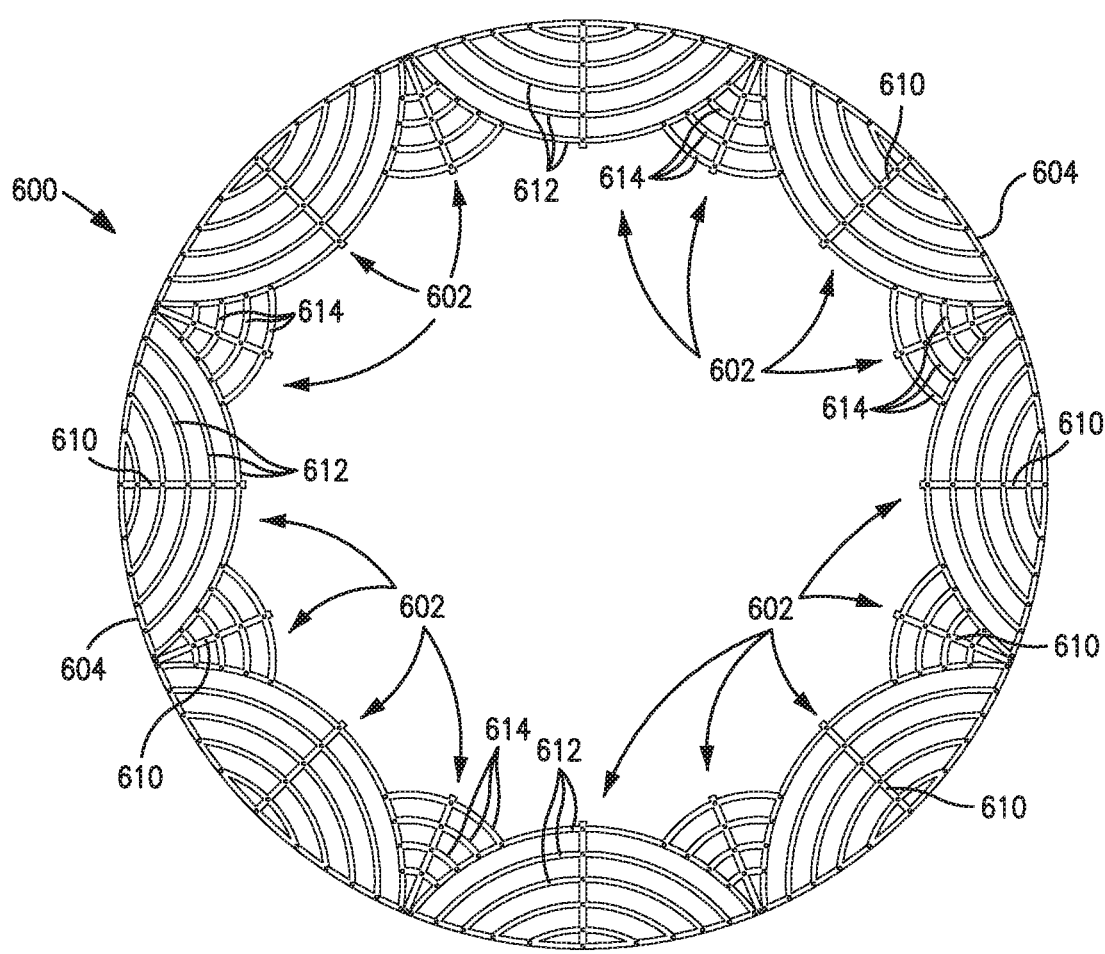
FIG. 20 is a top view of the of the ring-shaped support grid suitable for use in embodiments of the present annular divided wall column.

Collectors, Distributors, and Support Structures within an Annular Divided Wall Column Turning now to FIG. 19 and FIG. 20, there is shown two views of a ring-shaped support grid 600. The illustrated ring-shaped support grid 600 has an inner annular edge member 602 and an outer annular edge member 604 and is configured to support a plurality of structured packing elements in the annulus column region. The outer annular edge member 604 is preferably attached to the first annular column wall while the inner annular edge member 602 remains unattached to the second annular column wall during operation of the distillation column system such that the thermal expansion and contraction of the second annular column wall in a radial direction and in an axial direction is independent of the thermal expansion and contraction of the ring-shaped support grid 600 and the first annular column wall in the radial and axial directions.

In the illustrated embodiment, the ring-shaped support grid 600 further comprises a plurality of rigid bars 610 radially disposed around the ring-shaped support grid 600 and connecting the outer annular edge member and the inner annular support member. The ring-shaped support grid 600 further includes a plurality of primary arcuate support ribs 612 and a plurality of secondary arcuate support ribs 614. Each of the primary arcuate support ribs 612 have ends that are preferably attached to different locations of the outer annular edge member 604 whereas each of the secondary arcuate support ribs 614 have ends preferably attached to other primary arcuate support ribs 612. The primary arcuate support ribs 612 may also be attached to the radial bars 610.

Figure 21:
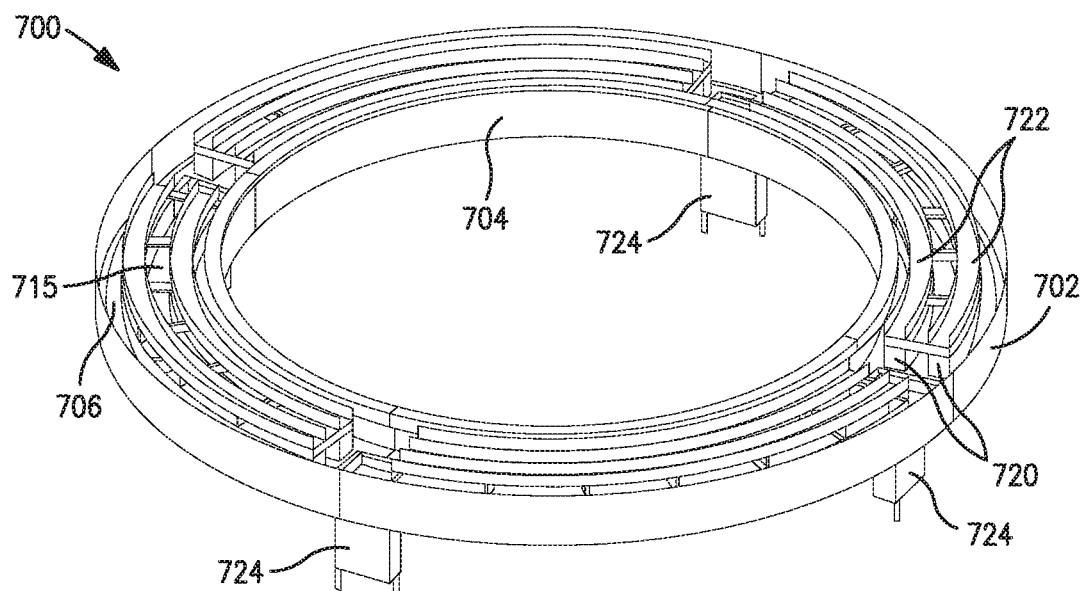
FIG. 21 is a partial isometric view of the ring-shaped cantilevered collector suitable for use in embodiments of the present annular divided wall column.
Figure 22:
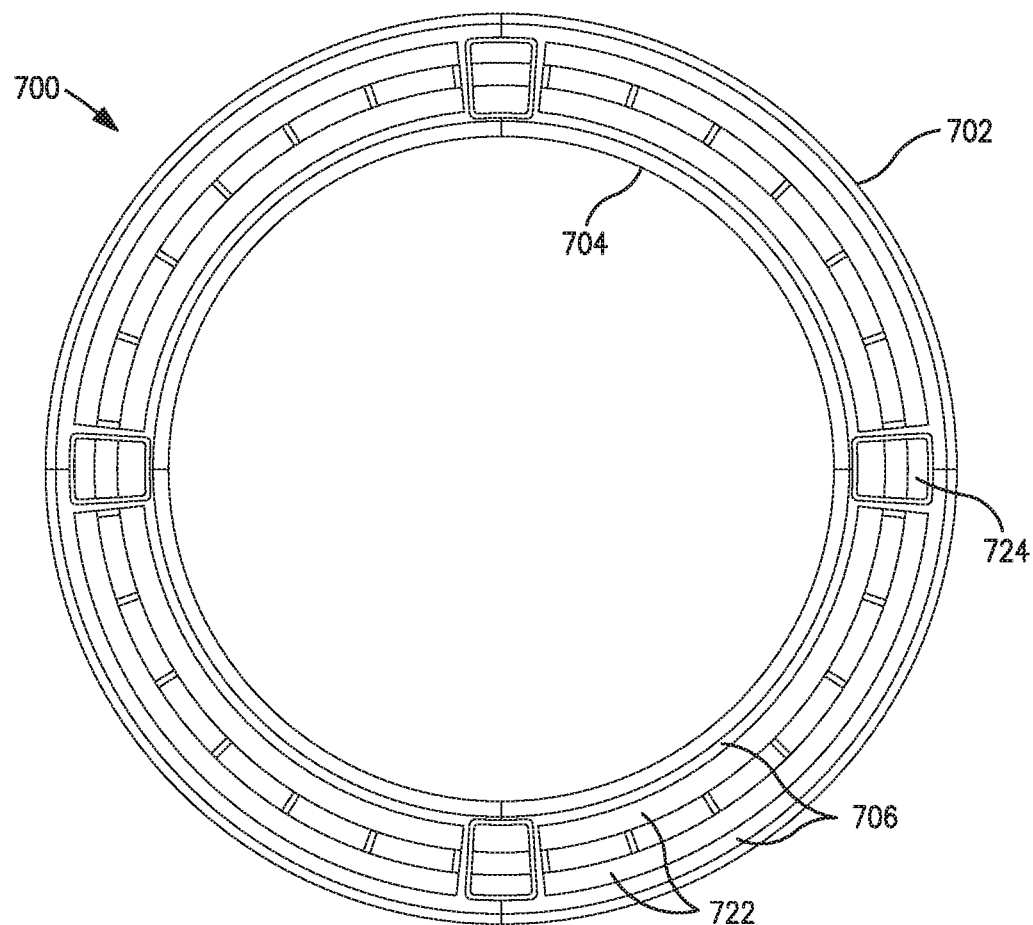
FIG. 22 is a top view of the ring-shaped cantilevered collector suitable for use in embodiments of the present annular divided wall column.
Figure 23:
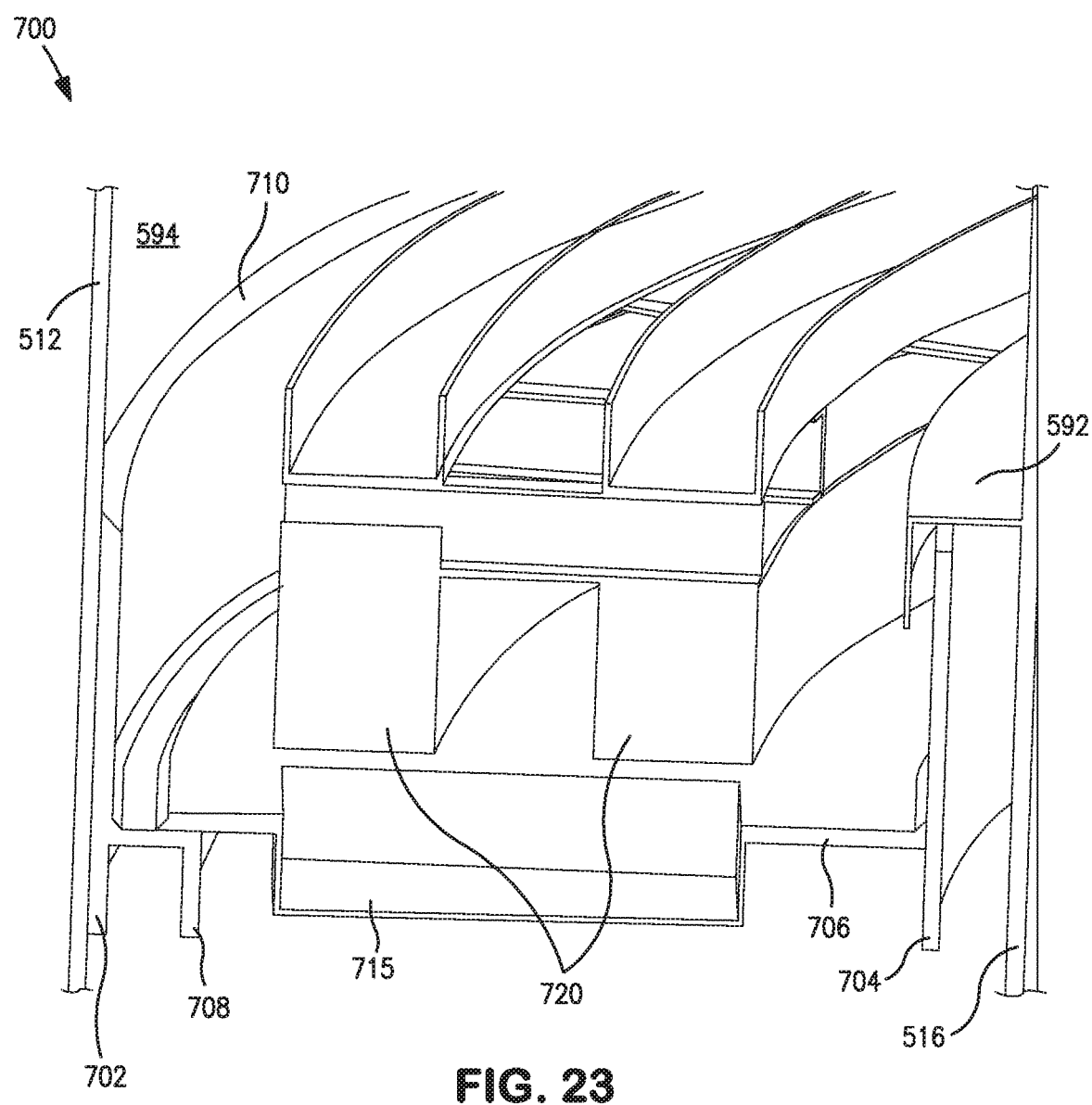
FIG. 23 is a partial cross section view of the ring-shaped cantilevered collector.

Turning now to FIG. 21, FIG. 22, and FIG. 23, there are shown different views of a ring-shaped cantilevered collector 700 configured to be placed in the annulus column region 514 above or below the plurality of structured packing elements. As seen most clearly in FIG. 23, the ring-shaped cantilevered collector 700 is preferably rigidly attached to one of the first annular column wall 512 or second annular column wall 516 and extends radially toward the other annular column wall around the entire circumference of the annulus column region 514. As shown in the Figures, the ring-shaped collector 700 includes a first collector wall 702, a second collector wall 704 and a collector deck 706 extending therebetween. The first collector wall 702 is configured to be attached to the first annular column wall 512 with the first collector wall 702 having a bottom support ring 708 and a tapered top edge 710 that facilitates transfer of descending liquid on the interior surface 594 of the first annular column wall 512 to the collector. The second collector wall 704 is configured to be arranged proximate the second annular column wall 516 but remains unattached to second annular column wall 516 thus defining the ring-shaped cantilevered collector 700. The collector deck 706 is attached to the support ring 708 of the first collector wall 702 and the second collector wall 704. The ring-shaped cantilevered collector 700 also includes one or more sumps 715 disposed in the collector deck 706 and circumferentially spaced around the collector deck. Downcomers 724 are connected to the one or more sumps and are configured to receive the liquid from the one or more sumps and direct such liquid to a liquid distributor disposed below the ring-shaped cantilevered collector.

The ring-shaped cantilevered collector 700 further includes a plurality of arcuate vapor risers 720 extending upwards from the collector deck 706 and configured to allow the ascending vapor in the annulus column region to rise through the ring-shaped cantilevered collector 700. The plurality of arcuate vapor risers 720 are disposed in a general ring-shaped pattern around the collector deck 706 and define liquid collection channels on the collector deck. On top of each of the vapor risers 720 is a cover or hat 722 that collects descending liquid that would otherwise fall into the interior space of the vapor riser. The liquid collected in the covers or hats 722 are channeled towards the one or more sumps or the liquid collection channels.

Since the ring-shaped cantilevered collector 700 is only rigidly attached to one of the annular column walls, the differing thermal expansion/contraction of the first and second annular column walls in a radial direction and/or in an axial direction does not adversely impact the performance of the liquid collector or the distillation occurring in the annulus column region.

Figure 24:
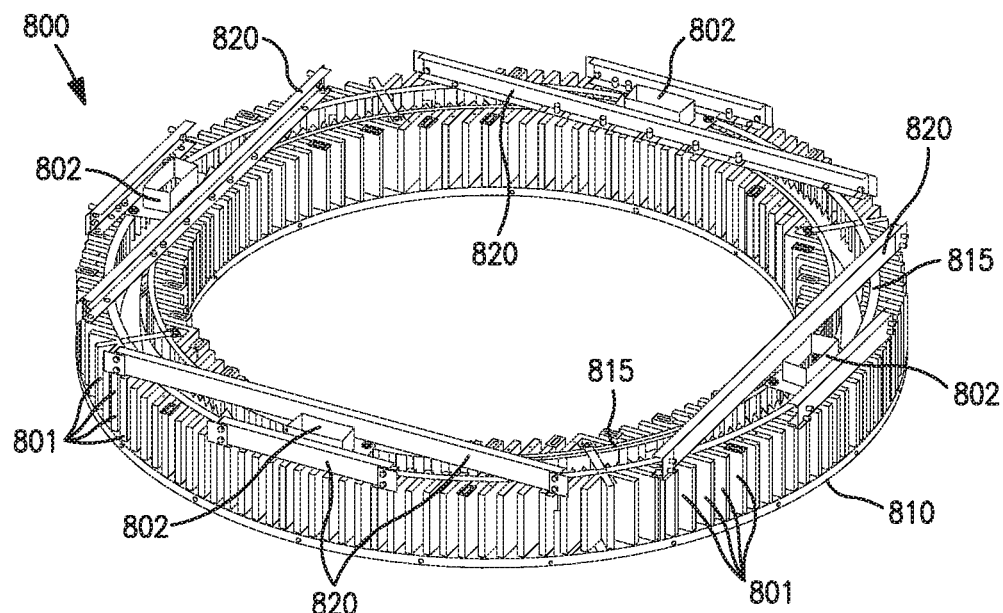
FIG. 24 is a partial isometric view of the ring-shaped distributor suitable for use in embodiments of the present annular divided wall column.
Figure 25:
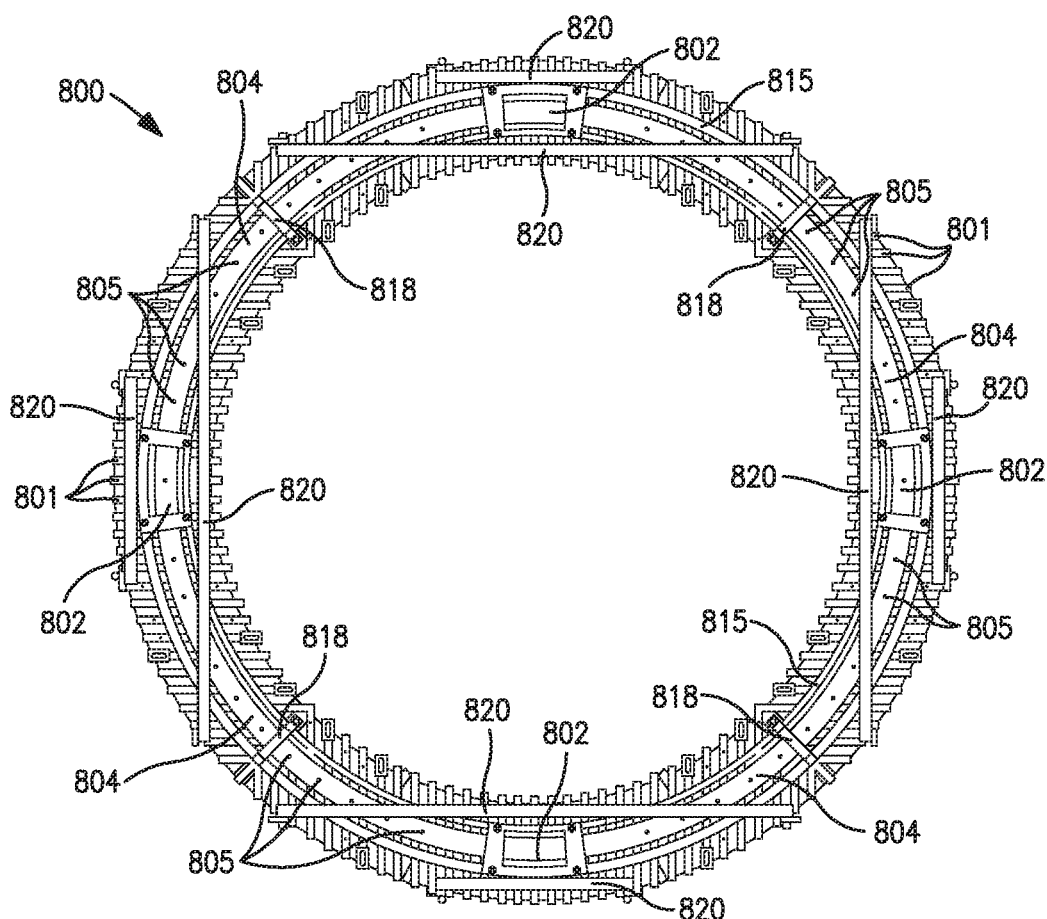
FIG. 25 is a top view of the ring-shaped distributor suitable for use in embodiments of the present annular divided wall column.

FIG. 24 and FIG. 25 show views of a ring-shaped distributor 800 configured to be placed in the annulus column region above a bed of the structured packing elements. The ring-shaped distributor 800 includes a plurality of pre-distribution boxes 802 configured to couple the ring-shaped distributor to the downcomers 724 of the ring-shaped collector 700 of the type described with reference to FIGS. 21-23. Although pan type distributors may be used, the illustrated ring-shaped distributor 800 is a trough type liquid distributor that includes an annular distributor channel 804 configured for distributing the liquid received from the collector via the pre-distribution boxes 802 in a generally circular pattern and plurality of troughs 801 disposed on each side of the annular distributor channel 804 and configured for distributing the liquid from the annular distributor channel to the structure packing bed immediately below the ring-shaped distributor 800 via apertures on the bottom surface of the troughs. The annular distributor channel also includes a plurality of apertures 805 for distributing a portion of the liquid to the surfaces of the structured packing elements directly below annular distributor channel 804.

The ring-shaped distributor 800 further includes a ring-shaped support base 810 configured to support the annular distributor channel 804 and plurality of troughs 801. A pair of annular support rings 815 are also disposed on top of the plurality of troughs 801 and attached thereto to support the pre-distribution boxes 802 and keep the plurality of troughs and annular distributor channel in the general ring-shaped configuration. There are also shown a plurality of stiffening structures 818 or arms extending between the pair of annular support rings also to keep the plurality of troughs and annular distributor channel in the general ring-shaped configuration. The plurality of troughs 801 are further arranged to allow ascending vapor from the structure packing bed immediately below the ring-shaped distributor 800 to flow upward between adjacent troughs and through the ring-shaped distributor.

As with other trough type liquid distributors, the distributors are hung from one or more support beams 820. In the illustrated embodiments, a plurality of support beams 820 are attached to the annular support rings and/or the plurality of troughs. The plurality of support beams 820 have one or both ends that are bolted or otherwise attached to one or more weld tabs extending from the interior surface of the first annular column wall (i.e. outer shell of the annulus column region) via one or more sliding clips. Again, since the ring-shaped distributor is only rigidly attached to the first annular column wall and not to the second annular column wall, the differing thermal expansion and contraction of the annular column walls in a radial direction and/or in an axial direction do not adversely impact the performance of the liquid distribution or the overall distillation occurring in the annulus column region. In addition, the ring-shaped distributor as well as the ring-shaped collector and may also be supported by a specially designed support plate that is attached to the column walls or that rests directly on the structured packing.

Uniform Flow Distribution within the Annular Divided Wall Column

When designing the present annular divided wall column arrangements, a key design challenge is to ensure the arrangement achieves the desired ascending vapor split between the annulus column region and the interior core column region. In other words, the correct amount of ascending vapor must be directed to both the annulus column region and to the interior core column region. If the desired ascending vapor split ratio between the annulus column region and the interior core column region is not the same as the ratio of the cross section areas of the annulus column region to the interior core column region, adjustments to the vapor split should be considered. One such preferred adjustment is to vary the design of the collectors. For example, by varying or adjusting the open area for vapor flow in the lowermost collector at the bottom of the annulus column region and the open area for vapor flow lowermost collector at the bottom of the interior core column regions so that it is proportional to the desired vapor split.

Another key design challenge is to ensure that the vapor and liquid being fed into the annulus column region is uniformly distributed around and across the annulus. The preferred structure and method to address this design challenge is to provide a symmetrical arrangement of the feed piping (inlet) and, to a lesser extent, the draw piping (outlet). In the presently disclosed embodiments, each feed piping (inlet) arrangement includes two or more feeds together with the use of horseshoe shaped sparger feed pipes that traverse around the annulus in a circular shape.

In addition, higher pour point densities may be needed or desired for the ring-shaped liquid distributors in the annulus column region compared to the pour point densities for the liquid distributors in the interior core column region to counteract higher susceptibility to wall flow in the annulus column region due to more wall area.

While the present inventions have been characterized in various ways and described in relation to the preferred structural embodiments and/or preferred methods, there are numerous additions, changes and modifications that can be made to the disclosed structures and methods without departing from the spirit and scope of the present invention as set forth in the appended claims. For example, while the present annular divided wall column has been shown and described as suitable for use in the cryogenic rectification of air or constituents of air in an air separation unit, it is fully contemplated that such annular divided wall column arrangements may also be suitable for the separation or purification of other industrial gases including off-gases or tail gases of various industrial processes.

We claim:

1. An annular divided wall column for cryogenic rectification of air or constituents of air, said column comprising:
a first annular column wall;
a second annular column wall radially spaced from the first annular column wall and disposed within a first interior space of the first annular column wall to define an annulus column region between the first annular column wall and the second annular column wall and to define an interior core column region as part or all of a second interior space of the second annular column wall;
a conical shaped transition wall connected to the second annular column wall proximate a top end of the second annular column wall and further connected to the first annular column wall and configured to isolate the annulus column region from the interior core column region proximate the top end of the second annular column wall;
a plurality of structured packing elements of a first type or trays disposed within the interior core column region; and
a plurality of structured packing elements of a second type disposed within the annulus column region;
wherein the conical shaped transition wall is either: (i) fixedly attached to the second annular column wall proximate the top end of the second annular column wall and moveably hung on the first annular column wall; or (ii) moveably connected to the second annular column wall proximate the top end of the second annular column wall and fixedly connected to the first annular column wall; and
wherein thermal expansion and contraction of the second annular column wall in a radial direction and in an axial direction is independent of the thermal expansion and contraction of the first annular column wall in the radial direction and in the axial direction.

2. The annular divided wall column of claim 1, wherein a vertical height of the first annular column wall is greater than a vertical height of the second annular column wall.

3. The annular divided wall column of claim 1, wherein the annulus column region is configured for rectification of an argon-oxygen containing stream to separate it into an argon-rich overhead stream and an oxygen-rich stream.

4. The annular divided wall column of claim 1, wherein the annulus column region is configured for rectification of a nitrogen-oxygen containing stream to separate it into a nitrogen rich overhead stream and an oxygen-rich stream.

5. The annular divided wall column of claim 1, wherein the interior core column region is configured for rectification of an argon-oxygen containing stream to separate it into an argon-rich overhead stream and an oxygen-rich stream.

6. The annular divided wall column of claim 1, wherein the interior core column region is configured for rectification of a nitrogen-oxygen containing stream to separate it into a nitrogen rich overhead stream and an oxygen-rich stream.

7. The annular divided wall column of claim 1, wherein the annulus column region is configured for rectification of a nitrogen-oxygen containing stream to separate it into a first nitrogen rich overhead stream and a first oxygen-rich stream of a first purity and the interior core column region is configured for rectification of the nitrogen-oxygen containing stream to separate it into a second nitrogen rich overhead stream and a second oxygen-rich stream of a second purity.

8. The annular divided wall column of claim 1, wherein the annulus column region is configured for rectification of a nitrogen-oxygen containing stream to separate it into a first nitrogen rich overhead stream of a first purity and a first oxygen-rich stream and the interior core column region is configured for rectification of the nitrogen-oxygen containing stream to separate it into a second nitrogen rich overhead stream of a second purity and a second oxygen-rich stream.

9. The annular divided wall column of claim 1, wherein the plurality of structured packing elements are constructed of materials selected from a group consisting of: aluminum sheet metal, stainless steel sheet metal, stainless steel gauze, silicon carbide; and plastic.

10. The annular divided wall column of claim 1, wherein the plurality of structured packing elements of a first type are disposed within the annulus column region and the plurality of structured packing elements of a second type are disposed within the interior core column region;

wherein the first type of structured packing elements and the second type of structured packing elements have different surface area densities.

11. The annular divided wall column of claim 10, wherein the plurality of structured packing elements of the first type and of the second type have a surface area density between about 100 $m^2/m^3$ to 1200 $m^2/m^3$.

12. The annular divided wall column of claim 1, wherein the plurality of structured packing elements of a first type are disposed within the annulus column region and the plurality of structured packing elements of a second type are disposed within the interior core column region;

wherein the first type of structured packing elements and the second type of structured packing elements have different geometries.

13. The annular divided wall column of claim 12, wherein the plurality of structured packing elements have a geometry that includes a nominal inclination angle of corrugations to the horizontal axis of between about 35° to 70°.

14. The annular divided wall column of claim 1, wherein the plurality of structured packing elements are configured as rectangular bricks or arcuate shaped wedges.

* * * * *